Feb. 15, 1949. W. J. MORRILL 2,461,566

DYNAMOELECTRIC MACHINE ROTOR CONSTRUCTION

Filed Dec. 22, 1944

INVENTOR.
Wayne J. Morrill
BY
Woodling and Krost
attys

Patented Feb. 15, 1949

2,461,566

UNITED STATES PATENT OFFICE 2,461,566

DYNAMOELECTRIC MACHINE ROTOR CONSTRUCTION

Wayne J. Morrill, Fort Wayne, Ind.

Application December 22, 1944, Serial No. 569,310

6 Claims. (Cl. 171—209)

My invention relates in general to rotors for dynamo-electric machines and more particularly to rotors having a permanent magnet field.

The operation of a dynamo-electric machine having a rotor constructed of a permanent magnet field is somewhat different from the operation of a conventional excited machine, in that with the conventional dynamo-electric machine the de-magnetization or the cross-magnetization of the rotor is accompanied by no permanent ill effects. On the other hand, a rotor having a permanent magnet field may be seriously affected by the demagnetization or the cross-magnetization. The cross-magnetization of a permanent magnet field can readily result in a shifting of the poles and consequently a weakening of the magnet and in a permanent reduction in the generated voltage. The de-magnetization of such a field may also permanently reduce the strength of the magnet and reduce the generated voltage. Such reduction is, of course, the equivalent of a reduction in the effective capacity of the machine, the result being that, unless some means for preventing the permanent ill effects of de-magnetization or cross-magnetization is provided, it is necessary to build a considerably larger generator to obtain one having the desired output.

In order to obtain a generator having good voltage regulation characteristics, it is necessary to provide stator windings having relatively low impedance. Such low impedance windings are naturally subject to very heavy currents under over-load and short circuit conditions and a large part of the magnetomotive force produced by the flow of these heavy currents through the stator winding may be applied at right angles to the direction of the permanent magnet flux of the rotor. As a result, the leading pole tip of the rotor is de-magnetized or "knocked down" and, since a trailing pole tip which is subject to over-magnetization is in its original state magnetized as high as possible, the permanent effect of the cross magnetization is to reduce the total flux of the pole and consequently the generated voltage of the dynamo-electric machine.

It is also possible under certain conditions that most of the magnetomotive force produced by heavy currents in the stator windings may become directly opposed to the permanent magnet flux of the rotor, resulting in a permanent reduction of the magnetic flux of the rotor, the end result being a permanent reduction in the generated voltage of the machine.

An object of my invention is to provide an improved rotor for a dynamo-electric machine, which rotor has permanently built-in features which oppose the de-magnetizing of the permanent magnet field of the rotor.

Another object of my invention is the provision of a rotor which will stand a great deal of magnetic abuse without materially de-magnetizing the permanent magnet field.

Another object of my invention is the provision of a permanent magnet type of rotor wherein the permanent magnet is maintained at substantially uniform field strength throughout the major portion of the pole faces of the magnet.

Another object of my invention is the provision of a permanent magnet type of rotor having a reinforcing sleeve of magnetic material surrounding the permanent magnet field element, whereby the mass of the body of the sleeve is greater at the pole surface regions than at the interpole surface regions, so that flux from the stator is prevented from penetrating the permanent magnet.

Another object of my invention is the provision of a permanent magnet type of rotor having a reinforcing sleeve of magnetic material surrounding the permanent magnet field element, whereby the mass of the body of the sleeve is greater at the pole surface regions than at the interpole surface regions, so that there is very little magnetic distortion throughout the pole faces of the rotor under conditions of heavy cross-magnetization.

Another object of my invention is the provision of a permanent magnet type of rotor having a reinforcing sleeve of magnetic material surrounding the permanent magnet field element, whereby the mass of the body of the sleeve is greater at the pole surface regions than at the interpole surface regions, thus preventing the disturbing stator space and time harmonics from penetrating to the magnet with consequent de-magnetizing action.

Another object of my invention is the provision of a permanent magnet type rotor having windings superimposed on the outer surface of the magnet, which avoids the necessity of slotting the permanent magnet.

Another object of my invention is the provision of a reinforcing sleeve of magnetic material surrounding the permanent magnet field element, whereby the portions of the sleeve which embrace the interpole surface regions of the permanent magnet element and which contain the heavy short circuited winding have less magnetic material than the portions of the sleeve which embrace the pole surface regions and which contain the distributed winding, to effect a greater non-magnetic gap between the rotor and the stator at the interpole surface regions than at the pole surface regions.

Another object of my invention is the provision of a distributed winding located in the region of the pole faces of the rotor to serve the dual purpose of reducing pole face distortion and of reducing the fluxes which have a relative speed with respect to the rotor.

Another object of my invention is the provision of a rotor construction having a permanent magnet core, which core is substantially free from external fluxes.

Another object of my invention is the provision of a rotor which is adapted to operate within a stator of a dynamo-electric machine and which rotor, because of its construction, produces in the stator substantially only such fluxes as move with respect to the stator at fundamental speed, thereby eliminating harmonics from the stator voltage wave.

Another object of my invention is the provision of a permanent magnet type of rotor which is simple of manufacture and which will stand a great deal of mechanical abuse and which will maintain its magnetic properties throughout a long period of operation.

Other objects and a fuller understanding of my invention may be had by referring to the following description and claims, taken in combination with the accompanying drawing, in which:

Figure 1:
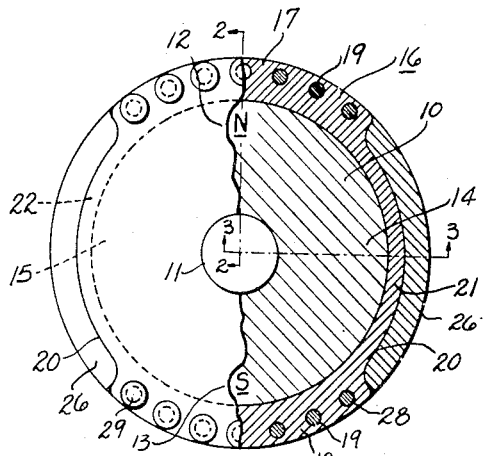
Figure 1 is an end view of a rotor embodying the features of my invention, with substantially the right half thereof shown in cross-section.

With reference to the drawing, the permanent magnet field is indicated by the reference character 10 and may be cast or otherwise produced about a shaft 11. The permanent magnet field may be in the form of a solid rotor or core and cast or otherwise suitably made of material which when magnetized has a high magnetic retentivity and which will have the property of maintaining the magnetism over a long period of time. Present materials having this property are extremely hard and brittle.

The windings for my rotor are superimposed externally of the permanent magnet field with the result that with my type of construction there is no need to slot the external surface of the magnet to receive the windings. Such slotting would not only be difficult to perform mechanically, but would also materially weaken the magnet both magnetically and mechanically.

The windings of my rotor comprise a main short circuited turn and a plurality of distributed short circuited auxiliary turns. The main short circuited turn is superimposed on the outer surface of the permanent magnet core 10 intermediate the pole regions of the magnet and the plurality of distributed short circuited auxiliary turns are superimposed on the outer surface of the permanent magnet core 10 in the region of the pole faces. In the drawings I have illustrated two pole faces disposed substantially 180 degrees apart; namely, a south pole which is indicated by the letter S and a north pole which is indicated by the letter N, but it is to be understood that my invention applies equally well to a larger number of pole faces. The north pole region of the permanent magnet core is indicated generally by the reference character 12, and the south pole region by the reference character 13. Between the north and south pole regions are two interpole regions 14 and 15.

Figure 3:
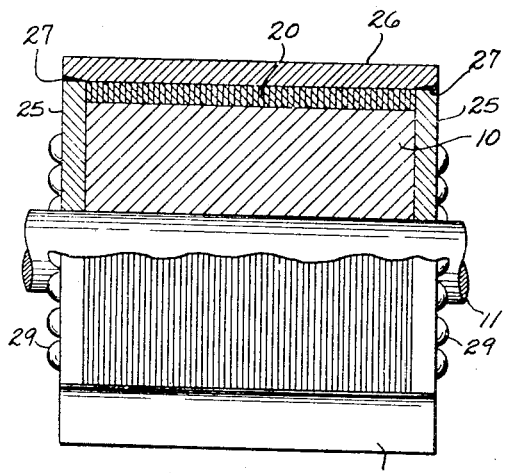
Figure 3 is an elevational side view of my rotor with substantially the upper half shown in cross-section, said cross-section being taken along the line 3—3 of Figure 1.

The windings of my rotor are carried by a laminated sleeve 16 which may be constructed of a plurality of stacked laminations. As illustrated, the laminated sleeve 16 completely surrounds the permanent magnet core and constitutes an external structure for reinforcing the permanent magnet core so that it may withstand a large amount of centrifugal force. The sleeve body portions 17 and 18 which embrace, respectively, the north and south pole regions 12 and 13, have laterally extending slots 19 to receive current conductor bars 28 which constitute the distributed windings of the rotor. The sleeve body portions 21 and 22 which substantially embrace respectively the inner pole regions 14 and 15 have a peripherally removed section to provide a peripheral recess 20 in each of the sleeve body portions 21 and 22. Mounted in the peripheral recesses 20 are arcuate current conductor plates 26 which comprise the main short circuited turn in combination with end plates 25 which are disposed next adjacent to the ends of the permanent magnet core 10. As shown in Figure 3, the arcuate current conductor plates 26 are connected to the end plates 25 at 27. Any suitable means may be employed to connect the arcuate current conductor plates 26 to the end plates 25. I preferably make this connection by brazing or by silver soldering as indicated at 27 to keep the electrical resistance to a minimum. The current conductor bars 28 which extend through the slots 19 may comprise copper rivets or any other low electrical resistance material. The ends of the rivets may be provided with heads 29 to keep them from coming out of the slots and to make a good electrical connection with the end plates 25. The arcuate current conductor plates 26 and the end plates 25 are preferably constructed of copper or any other low electrical resistance material to provide a minimum short circuited resistance to the flow of current.

The sleeve body portions 21 and 22 which have a peripherally removed section to provide a periphal recess therein to receive the arcuate current conductor plates 26 have a radial thickness which is thinner than that of the sleeve body portions 17 and 18 through which the current conductor bars 28 extend. In the drawing, the thickness of the sleeve body portions 21 and 22 is less than one half of the thickness of the sleeve body portions 17 and 18. The arcuate current conductor plates 26 which supplant the peripheral removed sections of the sleeve body portions 21 and 22 are thicker in a radial direction than the wall section of the sleeve body portions 21 and 22.

The magnetic material constituting the sleeve body portions 17 and 18 through which the current conductor bars 28 extend has the property of distributing the flux emanating from the stator so that the flux which emanates from the stator does not penetrate the permanent magnet core 10. More specifically, the magnetic material constituting the sleeve body portions 17 and 18 has the three-fold purpose of constituting a provision of a path for collecting the flux from the permanent magnet core 10 and distributing it between the current conductor bars 28, the provision of a bypass for the cross-magnetizing stator flux thereby preventing the stator flux from entering the permanent magnet core, and the provision of a by-pass for higher harmonic fluxes of the stator which might otherwise penetrate to the permanent magnet core and magnetically churn its surface. Such magnetic churning has a tendency to demagnetize and thus destroy the effectiveness of the permanent magnet core. The advantage of the flux collecting action of the magnetic material constituting the sleeve body portions 17 and 18 is best appreciated in the light of the characteristics of permanent magnet materials and what is known of their efficient use. Such permanent magnet materials operate efficiently in dynamo-electric machines when the flux density in the permanent magnet itself is uniform throughout the magnet and the density in the magnet is approximately half that which can be induced in the usual soft magnetic materials, of which the laminated sleeve is preferably made. The presence of the magnetic material constituting the sleeve body portions 17 and 18 tends to establish an equipotential magnetic surface at the poles of the permanent magnet core and thus tends to produce a uniform magnetic density in the permanent magnet material.

The arcuate current conductor plates 26, together with the current conducting end plate 25, constitute a heavy short circuited winding surrounding the main flux path of the permanent magnet. The purpose of this heavy short circuited winding is to prevent demagnetization of the permanent magnet under transient or short circuit conditions of the stator, and it has been determined that the conductivity of this short circuited turn should preferably be approximately equal to or slightly greater than the conductivity of the stator winding when measured with reference to the rotor winding.

If the stator is suddenly short circuited at the time that the rotor flux through it is maximum, the ensuing effects can be understood by use of the well-known principle applying to transients, termed the principle of "constant linkages." According to the principle of constant linkages, the flux linkage in any electro-magnetic structure must remain constant for the first instant following a short circuit because of the induced heavy currents which oppose a change in flux. With this in mind, it will be seen that immediately after a short circuit of the stator at a time approximating maximum rotor flux linkages, the short circuited stator winding will momentarily lock the linked flux in place while the rotor continues to turn first to a position at right angles to the locked flux and then to a position in which the permanent magnet is directly opposed to the locked flux. Under this opposed condition, the tendency would be for the permanent magnet to be directly demagnetized by the heavy reversed magnetomotive force of the stator and the characteristics of the dynamo-electric machine embodying the rotor would be permanently damaged. When a heavy short circuiting turn of conductivity equal to the referred conductivity of the stator winding is introduced around the permanent magnet of the rotor, the currents which are induced in this heavy short circuited turn tend to maintain the rotor flux at a constant value and, as a result, the magnetomotive force of the heavy rotor short circuiting turn opposes and neutralizes the magnetomotive force of the short circuited stator winding, preventing the permanent magnet rotor core from being demagnetized.

In the event that a short circuit should occur in the stator winding when the rotor flux linkages are substantially zero, a transient of a different type will take place because at that time there exists in the stator winding substantially maximum voltage. At this instant of short circuit, the current in the stator winding will rapidly rise and produce a strong stator magnetomotive force which will again have a demagnetizing effect on the rotor. Under certain conditions this last mentioned transient demagnetizing effect might be expected to be less than that occurring when the rotor flux linkages are maximum.

Because of the necessity, as outlined above, of providing a relatively high conductivity in the heavy short circuited winding, the current conducting plates 26 and the end rings or plates 25 are made relatively thick. The thickness of the current conducting plates 26 also renders the air gap large in the region of the plates. Because of the very large air gap no special precautions need to be taken to prevent rotor demagnetization in the interpole regions.

The current conducting bars 28 serve the dual purpose of assisting in preventing the "knockdown" or the permanent weakening of the flux in the leading pole tip under short circuit or transient conditions of the stator winding and reducing the magnitude of the third harmonic of voltage which is inherent in single phase alternators. Oscillographic tests show that by the use of these current conducting bars 28 the voltage wave of the generator closely approximates a sine wave, even under full load, single phase conditions. The current conducting bars 28 assist in preventing permanent distortion or "knock-down" of the permanent magnet flux because of the tendency for each adjacent current conducting bar 28 to maintain in the intermediately disposed magnet material a constant flux under transient conditions.

The laminated sleeves which surround the permanent magnet core 10 may be assembled and filled up around the magnet core or may be constructed as a separate unit in which the permanent magnet core is later mounted therein. Any suitable means may be employed to prevent mechanical slippage between the permanent magnet core 10 and the laminated sleeve 16. In normal operation of the rotor the speed may be of a very high order and the laminated sleeve affords protection to the permanent magnet core 10 at these very high speeds against the permanent magnet core disrupting due to large centrifugal forces. In other words, the laminated sleeve affords a safety measure in the event that the permanent magnet core should rupture.

Figure 2:
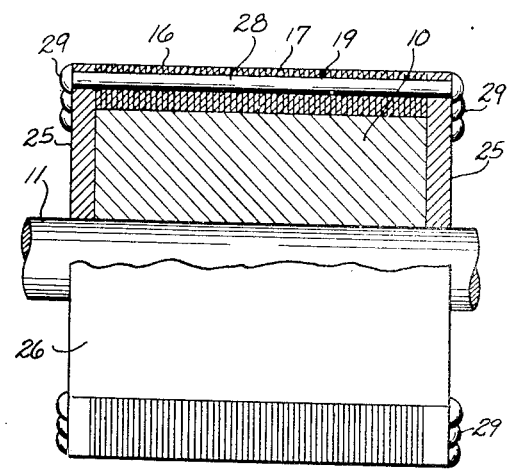
Figure 2 is an elevational side view of my rotor with substantially the upper half shown in cross-section, the cross-section being taken along the line 2—2 of Figure 1.
Figure 4:
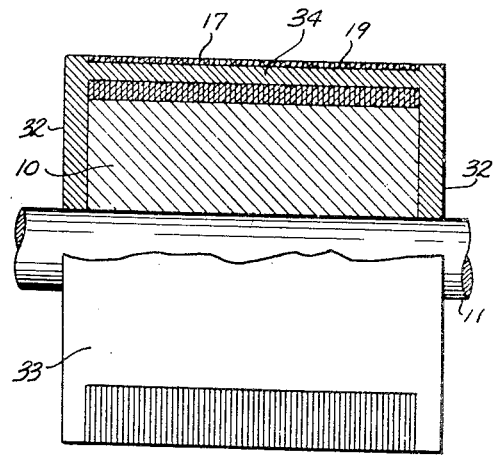
Figure 4 is a view similar to Figure 2 but shows a modified form of my invention, in that the current conducting parts are shown cast integrally about the permanent magnet core.

In Figure 4 the end plates 32, the arcuate current conducting plates 33 and the current conductor bars 34 are all cast integral about the permanent magnet core. The operation of the device in Figure 4 is substantially the same as that described with reference to the previous Figures 1 to 3, inclusive.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In a dynamo-electric machine having a stator, the improvement of a rotor comprising a permanent magnet field element, said element having pole surface regions and interpole surface regions, a reinforcing sleeve member of magnetic material surrounding said element, said sleeve member having first body portions substantially embracing said polt surface regions and having second body portions substantially embracing said interpole surface regions, said first body portions having slots, distributed short circuited winding means in said slots, said first body portions providing a by-path for the cross-magnetizing stator flux and thereby preventing stator flux from entering the permanent magnet field element, said second body portions having peripherally removed sections to provide peripheral recesses, whereby the radial thickness of the wall sections of the second body portions is thinner than that of said first body portions, heavy short circuited winding means in said recesses, said heavy short circuited winding means comprising a greater cross-sectional area than the distributed winding means and short circuiting the main flux path of the permanent magnet field element and thereby preventing demagnetization thereof, said heavy short circuited winding means supplanting the peripherally removed sections and thereby effecting a greater non-magnetic gap between the rotor and stator at the interpole surface regions than at the pole surface regions.

2. In a dynamo-electric machine having a stator, the improvement of a rotor comprising a permanent magnet field element, said element having pole surface regions and interpole surface regions, a reinforcing sleeve member of magnetic material surrounding said element, said sleeve member 1 aving first body portions substantially embracing said pole surface regions and having second body portions substantially embracing said interpole surface regions, said first body portions having circumferentially spaced slots, said second body portions having peripherally removed sections to provide peripheral recesses, whereby the radial thickness of the wall sections of the second body portions is thinner than that of said first body portions, winding means for said field element, said winding means comprising two portions, one of said winding portions including a distributed winding and the other of said winding portions including at least a heavy short circuited winding to prevent demagnetization of the permanent magnet field element, said at least heavy short circuited winding including a plurality of plate members mounted in said recesses, said plate members having end connections to complete the heavy short circuited winding, said distributed winding including a plurality of circumferentially spaced bars in said slots, said spaced bars having end connections for producing a plurality of distributed short circuited turns, said first body portions providing a by-pass for the cross-magnetizing stator flux and thereby preventing stator flux from entering the permanent magnet field element, said plate members in said recesses supplanting the peripherally removed sections and thereby effecting a greater non-magnetic gap between the rotor and stator at the inner pole surface regions than at the pole surface regions.

3. In a dynamo-electric machine having a stator, the improvement of a rotor comprising, a permanent magnet field element having pole surface regions and interpole surface regions and having two end surfaces, a reinforcing sleeve member of magnetic material surrounding said element, said sleeve member having first body portions substantially embracing said pole surface regions and having second body portions substantially embracing said interpole surface regions, said first body portions having circumferentially spaced slots, said second body portions having peripherally removed sections to provide peripheral recesses, whereby the radial thickness of the wall sections of the second body portions is thinner than that of said first body sections, a main short circuited turn in said recesses and surrounding said field element, a plurality of distributed short circuited turns in said slots, said main short circuited turn having a conductivity which is substantially at least as great as the referred conductivity of the stator.

4. In a dynamo-electric machine having a stator, the improvement of a rotor comprising, a permanent magnet field element having pole surface regions and interpole surface regions and having two end surfaces, a reinforcing sleeve member of magnetic material surrounding said element, said sleeve member having first body portions substantially embracing said pole surface regions and having second body portions substantially embracing said interpole surface regions, said first body portions having circumferentially spaced slots, said second body portions having peripherally removed sections to provide peripheral recesses, whereby the radial thickness of the wall sections of the second body portions is thinner than that of said first body sections, winding means for said field element, said winding means including end rings disposed next adjacent to the end surfaces of the field element and conductor members in said slots and in said recesses, said conductor members extending from one end ring to the other and being integrally cast with said end rings, said conductor members in said recesses having a greater cross-sectional area than the conductor members in said slots and supplanting a perhiperal removed section to effect a greater non-magnetic gap between the rotor and stator at the interpole surface regions than at the pole surface regions.

5. In a dynamo-electric machine having a stator, the improvement of a rotor comprising, a permanent magnet field element having pole surface regions and interpole surface regions and having two end surfaces, a reinforcing sleeve member of magnetic material surrounding said element, said sleeve member having first body portions substantially embracing said pole surface regions and having second body portions substantially embracing said interpole surface regions, said first body portions having laterally extending small removed sections and said second body portions having laterally extending large removed sections to effect a greater non-magnetic gap between the rotor and the stator at the interpole surface regions than at the pole surface regions, a main short circuited turn surrounding said field element and extending across said interpole surface regions and supplanting the heavy removed sections of the second body portions, and a plurality of distributed short circuited turns extending across said pole surface regions and supplanting the small removed sections of the second body portions.

6. In a dynamo-electric machine having a stator, the improvement of a rotor comprising, a permanent magnet field element having pole surface regions and interpole surface regions and having two end surfaces, a reinforcing sleeve member of magnetic material surrounding said element, said sleeve member having first body portions substantially embracing said pole surface regions and having second body portions substantially embracing said interpole surface regions, said first body portions having laterally extending small removed sections and said second body portions having laterally extending large removed sections to effect a greater non-magnetic gap between the rotor and the stator at the interpole surface regions than at the pole surface regions, a main short circuited turn surrounding said field element and extending across said interpole surface regions and supplanting the heavy removed sections of the second body portions, and a plurality of distributed short circuited turns extending across said pole surface regions and supplanting the small removed sections of the second body portions, said main short circuited turn having a conductivity which is substantially at least as great as the referred conductivity of the stator.

WAYNE J. MORRILL.

REFERENCES CITED

The following references are of record in the file of this patent:

UNITED STATES PATENTS

| Number | Name | Date |
|---|---|---|
| 2,078,805 | Merill | Apr. 27, 1937 |
| 2,213,724 | Vogel | Sept. 3, 1940 |
| 2,257,824 | Tognola | Oct. 7, 1941 |
| 2,303,893 | Mullner | Dec. 1, 1942 |

FOREIGN PATENTS

| Number | Country | Date |
|---|---|---|
| 518,315 | Great Britain | Feb. 23, 1940 |
| 521,291 | Great Britain | May 17, 1940 |